US010170769B2

(12) United States Patent
Thomas et al.

(10) Patent No.: US 10,170,769 B2
(45) Date of Patent: Jan. 1, 2019

(54) METHOD OF HYDROPHOBIC TREATMENT OF A CARBON SUBSTRATE

(71) Applicant: COMMISSARIAT A L'ENERGIE ATOMIQUE ET AUX ENERGIES ALTERNATIVES, Paris (FR)

(72) Inventors: Yohann Thomas, Grenoble (FR); Marie Heitzmann, Sinard (FR); Joël Pauchet, Saint Martin D'uriage (FR); Maxime Schroder, Buironfosse (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/414,217

(22) Filed: Jan. 24, 2017

(65) Prior Publication Data

US 2017/0237078 A1    Aug. 17, 2017

(30) Foreign Application Priority Data

Feb. 11, 2016  (FR) .................................... 16 51084

(51) Int. Cl.
| H01M 4/86 | (2006.01) |
| H01M 4/88 | (2006.01) |
| H01M 8/0245 | (2016.01) |
| H01M 4/96 | (2006.01) |
| H01M 8/1018 | (2016.01) |
| B29B 15/10 | (2006.01) |

(52) U.S. Cl.
CPC ....... *H01M 4/8821* (2013.01); *H01M 8/0245* (2013.01); *B29B 15/10* (2013.01); *H01M 4/8605* (2013.01); *H01M 4/96* (2013.01); *H01M 2008/1095* (2013.01)

(58) Field of Classification Search
CPC .................................................... H01M 4/8821
USPC ......................................................... 427/384
See application file for complete search history.

(56) References Cited

U.S. PATENT DOCUMENTS

2003/0157397 A1* 8/2003 Barton ................ H01M 4/8605
                                                      429/481
2015/0096442 A1    4/2015 Sims et al.

FOREIGN PATENT DOCUMENTS

| CN | 102627719 | * | 5/2014 |
| JP | 2009170218 A | | 7/2009 |
| JP | 2012174456 A | | 9/2012 |
| JP | 2012234742 A | | 11/2012 |

OTHER PUBLICATIONS

French Search Report issued in FR 1651084 dated Jun. 2, 2016.
(Continued)

*Primary Examiner* — Tabatha L Penny
(74) *Attorney, Agent, or Firm* — Marshall, Gerstein & Borun LLP

(57) ABSTRACT

A method of treating a carbon substrate, includes the successive steps of impregnating the carbon substrate with an aqueous solution containing an amorphous fluorinated copolymer of tetrafluoroethylene and of perfluoromethoxy dioxole, drying the carbon substrate at a pressure lower than the atmospheric pressure, and obtaining a carbon substrate impregnated with a fluorinated copolymer. Such a carbon substrate may be used as a gas diffusion layer in a fuel cell.

15 Claims, 1 Drawing Sheet

(56) References Cited

OTHER PUBLICATIONS

Kolomytkin D.O. et al., "Hydrophobic properties of carbon fabrioc with Teflon AF 2400 fluoropolymer coating deposited from solutions in supercritical carbon dioxide," *Russian Journal of Physical Chemistry B*, vol. 5, No. 7 (Jan. 27, 2012).

* cited by examiner

METHOD OF HYDROPHOBIC TREATMENT OF A CARBON SUBSTRATE

TECHNOLOGICAL FIELD

The present disclosure relates to a method of treatment of a carbon substrate with a hydrophobic copolymer and, in particular, to energy storage, and more particularly the gas diffusion layers of fuel cells.

BACKGROUND

Generally, the hydrophobicity of a porous carbon substrate may be obtained by impregnation of a fluorinated polymer of polytetrafluoroethylene type (PTFE).

This type of hydrophobic treatment may be particularly adapted for certain elements of a fuel cell, particularly a gas diffusion layer, a gas diffusion electrode, a microporous layer, an active layer, or the catalyst support.

It may be carried out by treating the substrate with an emulsion of fluorinated polymer such as PTFE, by:

a/ immersing the substrate into a solution based on PTFE;
b/ drying the impregnated substrate in air;
c/ repeating steps a/ and b/ to reach the desired PTFE concentration;
d/ sintering the dried substrate at a temperature higher than the glass transition temperature of PTFE, generally at approximately 350° C.

Other variations have been envisaged, for example, the use of polyethersulfone or of fluorinated polymers other than PTFE.

Anyhow, this type of treatment generally requires sintering the substrate, thus increasing the general energy cost.

On the other hand, the hydrophobic polymer may be distributed in uncontrolled fashion, particularly when the substrate is made of carbon fibers. Indeed, in the case of the impregnation of a solution based on PTFE, the latter concentrates on the external surfaces of the substrate with a deficiency at the heart thereof.

SUMMARY OF THE SPECIFICATION

The presently described embodiments include a method enabling to overcome the problems described above (homogeneity of the treatment+energy cost decrease) due to a vacuum drying step and to the use of a specific fluorinated copolymer requiring no sintering step.

DETAILED DESCRIPTION

Figure 1:
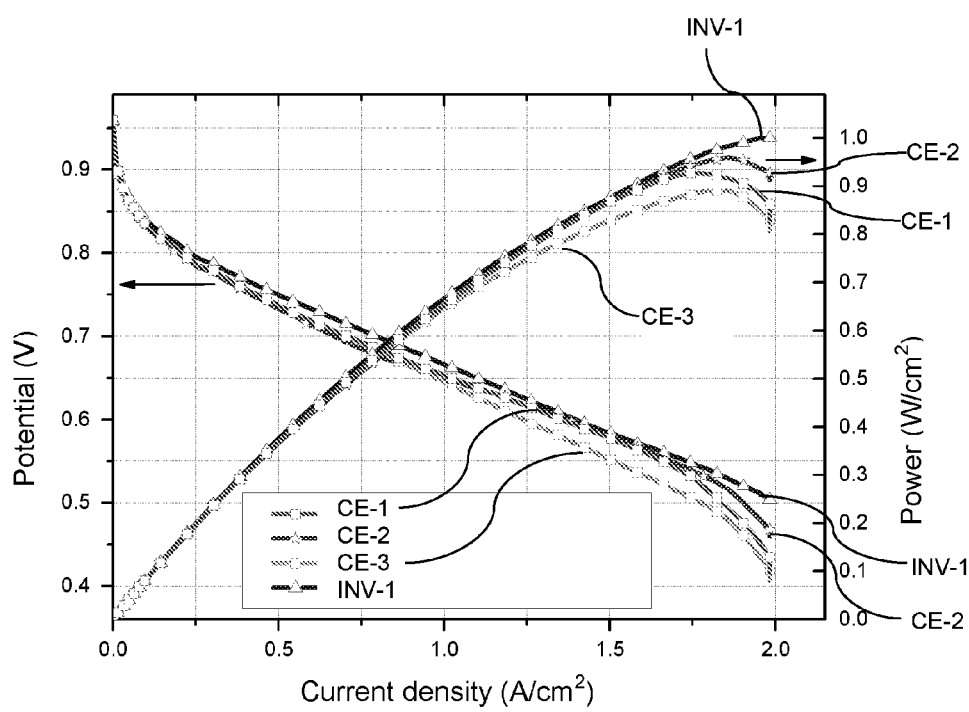
FIG. 1 illustrates the curves of the biasing and the curves of the power density of carbon substrates having undergone a hydrophobic treatment.

The presently described embodiments relate to a hydrophobic treatment method where the polytetrafluoroethylene (PTFE) conventionally used is replaced with an amorphous fluorinated copolymer.

Rather than a grafting modifying a substrate, this is a treatment of impregnation of a carbon substrate with an amorphous fluorinated copolymer.

Term "amorphous" means that the copolymer comprises no crystalline structure. The copolymer is made of an entanglement of macromolecular chains which respect no order at average and long distance.

More specifically, the presently described embodiments relate to a method of treating a carbon substrate, comprising the following successive steps of:

impregnating the carbon substrate with an aqueous solution containing an amorphous fluorinated copolymer of tetrafluoroethylene and of perfluoromethoxy dioxole;

drying the carbon substrate at a pressure lower than the atmospheric pressure;

obtaining a carbon substrate impregnated with a fluorinated copolymer.

Generally, the carbon substrate is a porous substrate, preferably made of carbon fibers. It may in particular be a carbon fiber nonwoven.

The carbon substrate has a porosity advantageously in the range from 70 to 95%, more advantageously from 75 to 90%.

The porosity corresponds to the percentage of void volume in the carbon substrate relative to its total volume.

The carbon substrate is advantageously a carbon fiber nonwoven having a thickness in the range from 25 to 300 micrometers.

According to the described embodiments, the carbon substrate is treated by impregnation with an aqueous solution of fluorinated copolymer.

The hydrophobic copolymer is an amorphous fluorinated copolymer of tetrafluoroethylene and of perfluoromethoxy dioxole. The monomers are randomly distributed.

The hydrophobic copolymer is advantageously a fluorinated copolymer corresponding to number CAS 161611-79-6.

It has an intrinsic viscosity advantageously in the range from 50 to 150 mg/L, more advantageously from 80 to 110 mg/L.

Unlike conventional PTFE-type fluorinated polymers, the copolymer of tetrafluoroethylene and of perfluoromethoxy dioxole requires no step of sintering beyond its glass transition temperature. Thus, the method has the advantage of decreasing the energy cost of the hydrophobic treatment due to the specific choice of the fluorinated copolymer used.

Since a hydrophobic copolymer is used, the aqueous solution used to impregnate the substrate generally is in the form of an emulsion. Term "dispersion" may also be appropriate to designate this aqueous solution.

Advantageously, the aqueous solution comprises from 1 to 60% of fluorinated copolymer, more advantageously from 5 to 15 wt. % with respect to the weight of the aqueous solution.

The impregnation of the carbon substrate is advantageously performed at a temperature in the range from 15 to 35° C., more advantageously from 20 to 30° C.

The impregnation time may be in the range from 1 to 10 minutes, more advantageously from 1 to 5 minutes.

The impregnation may be carried out under mechanical stirring of the aqueous solution or not, or by simple immersion. It may also be performed in vacuum, that is, at a pressure lower than the atmospheric pressure.

Once the carbon substrate has been impregnated with fluorinated copolymer, it is dried at a pressure lower than the atmospheric pressure.

As already indicated, this method requires no sintering step after the drying. The drying is thus carried out at a temperature lower than the glass transition temperature of the amorphous copolymer of tetrafluoroethylene and of perfluoromethoxy dioxole.

The drying temperature is advantageously in the range from 25 to 95° C., more advantageously from 30 to 80° C., and more advantageously still in the order of 55° C.

The drying time is advantageously in the range from 15 minutes to 5 hours, more advantageously from 20 minutes to 2 hours, and more advantageously still in the order of 30 minutes.

The drying step enables to remove the water from the water dispersion.

As already indicated, the drying is carried out at a pressure lower than the atmospheric pressure. During the drying, the pressure is advantageously in the range from 0.1 to 500 hPa, more advantageously from 0.1 to 250 hPa, and more advantageously still from 0.1 to 50 hPa (1 hPa=100 Pa).

Advantageously, at the end of the drying, the carbon substrate comprises from 0.5 to 25% of fluorinated copolymer, more advantageously from 1 to 15%, and more advantageously still from 2.5 to 10 wt. % with respect to the weight of the carbon substrate treated.

The impregnation and drying steps may be repeated to reach the desired quantity of fluorinated copolymer.

The substrate obtained may be used in a fuel cell with a membrane electrolyte, for example, advantageously in a proton exchange membrane fuel cell. Such a fuel cell may thus comprise at least one gas diffusion layer formed by this carbon substrate.

The carbon substrate treated may also be used in a battery, in an electrolyzer, as well as in microelectronics, semiconductor, or solar cell applications.

During its use, particularly as a gas diffusion layer in a fuel cell, the carbon substrate obtained enables to improve the cell performance with respect to substrates obtained by drying at the atmospheric pressure and with respect to substrates treated with a fluorinated polymer other than the copolymer of tetrafluoroethylene (TFE) and of 2,2,4-trifluoro-5-trifluoromethoxy-1,3-dioxole (TTD or perfluoromethoxy dioxole).

Without developing any theory, the Applicant considers that such property differences may be due to the vacuum drying step which enables to homogenize the treatment, that is, the distribution of the fluorinated copolymer, as compared with a drying in air.

The resulting advantages will better appear from the following drawings and examples, provided as a non-limiting illustration.

1/ Preparation of Gas Diffusion Layers

A carbon substrate has been impregnated according to the four different methods detailed in table 1 hereafter. This substrate is a carbon nonwoven capable of being used as a gas diffusion layer in a fuel cell. Its commercial reference is 24AA of SGL.

TABLE 1

Characteristics of the carbon substrate treatment methods.

| | Hydrophobic polymer | Drying | Sintering |
|---|---|---|---|
| CE-1 | PTFE | in air in an oven, at 95° C. for 30 minutes | Yes |
| CE-2 | PTFE | in vacuum, at 55° C., for 30 minutes | Yes |
| CE-3 | Hyflon ® | in air in an oven, at 95° C. for 30 minutes | No |
| INV-1 | Hyflon ® | in vacuum, at 55° C., for 30 minutes | No |

Polymer PTFE is polytetrafluoroethylene.

Polymer Hyflon® is a copolymer of tetrafluoroethylene (TFE) and of 2,2,4-trifluoro-5-trifluoromethoxy-1,3-dioxole (TTD).

Four gas diffusion layers have been prepared by impregnation with an aqueous solution of polymer (PTFE or Hyflon®). The polymers being hydrophobic, such solutions generally are in the form of emulsions.

The gas diffusion layers treated with PTFE have been submitted, after drying, to a sintering step at 350° C. for one hour in order to crosslink the PTFE.

The four gas diffusion layers thus obtained have a hydrophobic agent filling in the range from 0.5 to 25 wt. %.

2/ Cell Tests

The following assemblies have been formed:
gas diffusion layer;
microporous material made of a mixture of carbon black, of carbon fibers, and of PTFE;
catalytic layer;
perfluorosulfonic membrane;
catalytic layer;
microporous material made of a mixture of carbon black, of carbon fibers, and of PTFE;
gas diffusion layer.

Each assembly comprises two identical gas diffusion layers obtained according to the invention (INV-1) or according to a counter-example (CE-1 or CE-2 or CE-3).

These assemblies have been tested at 80° C., at 50% of relative humidity, under 1.5 bar of a 1.2/2 $H_2$/air stoichiometric mixture.

FIG. 1 illustrates the results of these tests. Generally, the treatment according to the invention (Hyflon® polymer+vacuum drying) enables to improve the cell performance.

FIG. 1 shows that the performance improvement is due to the double polymer+drying method selection.

Without developing any theory, it is possible for vacuum drying to provide a more homogeneous treatment than air drying.

3/ Fluorine Mapping

The distribution of the hydrophobic polymer within the carbon substrate has been analyzed by EDX (energy dispersive analysis) by detection of the presence of the signal of fluorine.

Generally, substrates dried in air exhibit an accumulation of fluorine (hydrophobic polymer) on the large carbon fibers, on the outer portions.

However, in substrates dried in vacuum, the fluorine (hydrophobic polymer) is distributed not only on the fibers but also between fibers, inside of the porous structure of the substrate.

The invention claimed is:

1. A method of treating a carbon substrate, comprising the following successive steps of:
   impregnating the carbon substrate with an aqueous solution containing an amorphous fluorinated copolymer of tetrafluoroethylene and perfluoromethoxy dioxole; and
   drying the impregnated carbon substrate at a pressure lower than the atmospheric pressure to obtain a treated carbon substrate impregnated with the fluorinated copolymer, wherein the method is free of sintering after drying.

2. The carbon substrate treatment method of claim 1, wherein the carbon substrate is a carbon fiber nonwoven having a thickness in the range from 25 to 300 micrometers.

3. The carbon substrate treatment method of claim 1, wherein the aqueous solution comprises from 1 to 60 wt. % of fluorinated copolymer.

4. The carbon substrate treatment method of claim 1, wherein the impregnation of the carbon substrate is performed at a temperature in the range from 15 to 35° C.

5. The carbon substrate treatment method of claim 1, wherein the drying temperature is in the range from 25 to 95° C.

6. The carbon substrate treatment method claim 1, wherein the drying time is in the range from 15 minutes to 5 hours.

7. The carbon substrate treatment method of claim 1, wherein the drying is carried out at a pressure in the range from 0.1 to 500 hPa.

8. The carbon substrate treatment method of claim 1, wherein, at the end of the drying, the treated carbon substrate comprises from 0.5 to 25 wt. % of fluorinated copolymer.

9. The carbon substrate treatment method of claim 1, wherein, at the end of the drying, the carbon substrate comprises from 1 to 15 wt. % of fluorinated copolymer.

10. The carbon substrate treatment method of claim 1, wherein, at the end of the drying, the carbon substrate comprises from 2.5 to 10 wt. % of fluorinated copolymer.

11. The carbon substrate treatment method of claim 1, wherein the aqueous solution comprises from 5 to 15 wt. % of fluorinated copolymer.

12. The carbon substrate treatment method of claim 1, wherein the drying is carried out at a pressure in the range from 0.1 to 250 hPa.

13. The carbon substrate treatment method of claim 1, wherein the drying is carried out at a pressure in the range from 0.1 to 50 hPa.

14. The carbon substrate treatment method of claim 1, wherein the drying temperature is in the range from 30 to 80° C.

15. The carbon substrate treatment method of claim 1, wherein the method is performed at a temperature lower than the glass transition temperature of the amorphous fluorinated copolymer.

* * * * *